(12) United States Patent
Barkan et al.

(10) Patent No.: US 8,261,991 B2
(45) Date of Patent: Sep. 11, 2012

(54) HIGH PERFORMANCE IMAGE CAPTURE READER WITH LOW RESOLUTION IMAGE SENSOR

(75) Inventors: Edward Barkan, Miller Place, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 184 days.

(21) Appl. No.: 12/834,312

(22) Filed: Jul. 12, 2010

(65) Prior Publication Data

US 2012/0006897 A1   Jan. 12, 2012

(51) Int. Cl.
*G06K 7/10* (2006.01)
*G06K 15/12* (2006.01)

(52) U.S. Cl. .......... 235/462.41; 235/472.01; 235/462.45

(58) Field of Classification Search .................. 235/454, 235/462.01–462.49
See application file for complete search history.

(56) References Cited

U.S. PATENT DOCUMENTS

| | | | |
|---|---|---|---|
| 4,613,895 A | | 9/1986 | Burkey et al. |
| 5,703,349 A | | 12/1997 | Meyerson et al. |
| 5,710,417 A | * | 1/1998 | Joseph et al. ............ 235/462.11 |
| 5,736,724 A | * | 4/1998 | Ju et al. ..................... 235/462.11 |
| 6,732,930 B2 | * | 5/2004 | Massieu et al. ............ 235/462.1 |
| 7,611,060 B2 | * | 11/2009 | Wang et al. ............... 235/462.23 |
| 2006/0011724 A1 | * | 1/2006 | Joseph et al. ................. 235/454 |

FOREIGN PATENT DOCUMENTS

EP   1087325   3/2001

OTHER PUBLICATIONS

International Search Report and Written Opinion dated Apr. 13, 2011 in related case PCT/US2010/062621.

* cited by examiner

*Primary Examiner* — Jamara Franklin
(74) *Attorney, Agent, or Firm* — Nong-Qiang Fan

(57) ABSTRACT

A reader for and method of electro-optically reading symbols aim a front of a handheld housing at a symbol during reading. A solid-state, low resolution image sensor having a linear array of pixels is arranged in the housing and has less than 2000 pixels in number. The pixels sense return light returning along an optical path away from the symbol that is located in an extended range of working distances relative to the front of the housing. An imaging lens is positioned deep in the housing at an increased spacing of at least one inch as measured along the optical path away from the front of the housing, for capturing the return light over a reduced scan angle that is less than 40 degrees, and for projecting the captured light onto the sensor. A controller processes the return light sensed by the imager into data relating to the symbol.

18 Claims, 2 Drawing Sheets

HIGH PERFORMANCE IMAGE CAPTURE READER WITH LOW RESOLUTION IMAGE SENSOR

DESCRIPTION OF THE RELATED ART

Solid-state imaging systems or imaging readers, both corded and cordless, have been used, in both handheld and hands-free modes of operation, to capture images from targets, such as symbols to be electro-optically decoded and read and/or non-symbols to be processed for storage or display. Symbols include one-dimensional bar code symbols, particularly of the Universal Product Code (UPC) symbology, each having a linear row of bars and spaces spaced apart along a scan direction. The bars and spaces, which are known as symbol elements, have various widths that, when decoded, uniquely identify a product and its manufacturer. Non-symbol targets can include any person, place or thing, e.g., a signature, whose image is desired to be captured by the imaging reader.

The imaging reader includes a solid-state, image sensor comprising an array of pixels or light sensors, for sensing return light from the target being imaged. The image sensor may be a one- or two-dimensional charge coupled device (CCD) or a complementary metal oxide semiconductor (CMOS) device, and is analogous to the image sensors used in electronic digital cameras. The imaging reader preferably includes an illuminating light assembly for illuminating the target with illumination light from an illumination light source, e.g., one or more light emitting diodes (LEDs). The imaging reader further includes an imaging lens assembly, e.g., one or more imaging lenses, for capturing return ambient and/or illumination light scattered and/or reflected from the target over a field of view and over a range of working distances, as measured from a front of the reader. The imaging reader further includes electrical circuitry for producing electronic analog signals corresponding to the intensity of the light captured by the image sensor over the field of view. The imaging reader yet further advantageously includes an aiming light assembly for projecting a visible aiming light pattern, for example, a generally circular spot or cross-hairs for placement at the center of the target, a line for placement across the target, or framing lines to bound the field of view, to assist an operator in visually locating the target within the field of view prior to image capture.

When the target is a symbol, signal processing circuitry including a digitizer is used for digitizing the analog signal, and a programmed microprocessor or controller is used not only for controlling the operation of the electrical components in the reader, but also for processing and decoding the digitized signal based upon a specific symbology used for the symbol. When the target is a non-symbol, the signal processing circuitry will typically de-skew the captured image, re-sample the captured image to be of a certain size, enhance the quality of the captured image, and compress the captured image prior to transmission to a memory or a remote host.

It is therefore known to use the image sensor for capturing a monochrome image of the symbol as, for example, disclosed in U.S. Pat. No. 5,703,349. It is also known to use the image sensor with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Yet, as advantageous as the known imaging readers have been, achieving high performance and successfully performing reading of one-dimensional symbols, with a linear image sensor, over an extended range of working distances relative to the reader, have required using linear image sensors of high resolution and high cost. For example, it is known to use expensive linear image sensors having a resolution of 3600 pixels to achieve a working distance range of about 24 inches, and 2500 pixels to achieve a working distance range of about 23.4 inches.

The working distance range of an imaging reader is limited by a combination of factors, including the focusing characteristics of the imaging lens assembly, the intensity of the illumination light, the light sensitivity of the image sensor and the resolution of the image sensor. When conventional opto-mechanical designs are used, high resolution sensors with a large number of pixels must be used so as to avoid limiting the working distance range due to lack of adequate resolution. To clarify, the imaging lens assembly projects the individual pixels of the image sensor onto a virtual scan line out in front of the reader, where the symbol is positioned for reading. As the symbol is moved farther away from the reader, the virtual scan line grows, stretching each pixel over a wider and wider portion of the symbol. At some distance, the pixels are too large to adequately resolve the bars and spaces in the symbol, and the symbol can, therefore, no longer be decoded. If a low resolution sensor were simply substituted into the same optical system for a high resolution sensor, then this resolution limit is reached sooner, and the working distance range of the imaging reader is reduced.

Even if the resolution remains adequate to read symbols at the far end of the extended range, there must be sufficient light projected onto the symbol by the illuminating light assembly to provide an adequate signal-to-noise ratio at the maximum far end of the range. As a symbol is positioned farther away from the reader, the illumination light diverges in a way similar to the field of view of the imaging lens assembly. Otherwise, parts of the virtual scan line will not be useable, thereby wasting the capabilities of the expensive high resolution sensor. As the illuminated area increases with distance, the intensity of the illumination at any point on the symbol is reduced, until at some distance the signal-to-noise ratio becomes too low for the reader to function. The point where the illumination level ultimately becomes too low for the reader to operate reliably depends on the light sensitivity of the sensor. Image sensors with resolutions below 2500 pixels have not heretofore been used due, among other things, to their poorer sensitivity to light.

In conventional imaging readers, the image sensor and the imaging lens assembly are positioned relatively closely to a front or nose of a handheld housing of the reader, such that the imaging lens is typically around 0.7 to 0.9 inches from the front of the housing. The front of the housing may, but need not be, a light-transmissive window through which the return light passes en route to the imaging lens assembly and the sensor. If multiple imaging lenses are used, then the lens furthest from the sensor is the one positioned around 0.7 to 0.9 inches from the front of the housing. It is desirable to be able to decode UPC symbols starting at not more than around one inch, and preferably a half inch from the front of the housing, since sometimes users position symbols that close to the front of the housing. To do this, the virtual scan line must grow rapidly from its origin at the imaging lens over a scan angle to be large enough to cover the entire symbol at the closest desired working distance. A 100% (the 100% represents the size or magnification of the UPC symbol) UPC symbol is used as an example here, since it is the most commonly scanned symbol at point-of-sale checkout workstations at retail sites and measures around 1.25 inches wide.

Hence, most readers have a virtual scan line at least that wide at a distance between a half inch and one inch in front of the nose of the housing. This requirement to read 100% UPC symbols starting at around a half inch to one inch is what determines the size of the scan angle that the imaging lens assembly must produce. For example, if the imaging lens (which is the origin of the virtual scan line) is about 0.9 inches back from the nose of the housing, and if the symbol that is about 1.25 inches wide must be entirely covered when the symbol is positioned about 0.5 inches from the nose of the housing, then the scan angle must be at least 48 degrees to cover the symbol in the near working distance range.

When reading at 24 inches at the far end of the working distance range, for example, the resolution of the sensor must be adequate to resolve the individual bars and spaces in the symbol. In general, this means that the individual pixel size as projected at that far distance must be no larger, and preferably smaller than, the smallest individual bar or space on the symbol. The exact maximum pixel size that can be tolerated varies somewhat among manufacturers, depending on the capability of their signal processing software. However, in general, when the pixel size approaches around the size of a small bar of the symbol, maximum range has been reached. For example, at 24 inches from the nose of the housing (which is around 24.9 inches from the imaging lens), the virtual scan line length in a known reader is around 22.2 inches. If 2500 pixels of the sensor are spread across this virtual scan line length, each pixel is about 0.0089 inches wide. This is smaller than the 0.013 inch narrow bars and spaces in a 100% UPC symbol. Hence, the symbol can be adequately resolved at this distance for decoding.

If fewer pixels than 2500 pixels were used, e.g., 1500 pixels, then the scan angle would have to be the same, e.g., about 48 degrees, in order to cover the UPC symbol at a half inch from the nose of the housing in the near working distance range. Hence, the virtual scan line length at 24 inches from the nose would be the same. This time, however, only 1500 pixels would have been spread across that 22.2 inch virtual scan line. Hence, each pixel would be about 0.0148 inches wide. This is larger than the 0.013 inch bars and spaces in a 100% UPC symbol, thereby providing inadequate resolution, and ruling out the use of the lower resolution 1500 pixel sensor.

Accordingly, it would be desirable to enable the use of lower resolution linear image sensors with their attendant low cost benefit, while still providing adequate resolution to read symbols at the far end of the working distance range of about 24 inches and beyond, while also providing a virtual scan line long enough to entirely cover a symbol at the near end of the working distance range of about a half inch, and without sacrificing reading performance due to the poorer light sensitivity associated with lower resolution linear image sensors.

SUMMARY OF THE INVENTION

The present invention generally relates to a reader for electro-optically reading symbols by image capture. The reader includes a handheld housing having a front that faces a symbol during reading, a solid-state image sensor having a linear array of pixels arranged in the housing along a scan direction for sensing return light returning along an optical path away from the symbol that is located in a range of working distances relative to the front of the housing, an imaging lens in the housing for capturing the return light over a scan angle and for projecting the captured light onto the sensor, and a controller for processing the return light sensed by the sensor into data relating to the symbol.

One aspect of the present invention resides, briefly stated, in configuring the image sensor as a low resolution image sensor having less than 2000 pixels in number. Preferably, the image sensor is a one-dimensional charge coupled device (CCD) and has 1500 pixels in number. Also, the imaging lens is positioned deep in the housing at an increased spacing of at least one inch, and preferably greater than 1.5 inches, as measured along the optical path away from the front of the housing. The imaging lens is configured to capture the return light over a reduced scan angle that is less than 40 degrees. The imaging lens projects the pixels over a virtual scan line that extends over the scan direction entirely across the symbol located at about one-half inch away from the front of the housing in a near region of the range of working distances, and projects the pixels over a shortened virtual scan line that extends over the scan direction across the symbol located at about twenty-four inches away from the front of the housing in a far region of the range of working distances.

These features depart from the above-described conventional opto-mechanical designs of linear image sensors so as to enable the use of lower resolution, cheaper sensors, while still providing adequate resolution to read symbols at and beyond working distances of about 24 inches away from the front of the housing, and also providing a virtual scan line long enough to cover a symbol that is located only around a half inch away from the front of the housing. Unlike the prior art reader, which locates its imaging lens very close to the front of the housing, one aspect of this invention moves the imaging lens further back into the housing away from the front of the housing. This allows the imaging lens to be focused with a much narrower scan angle, while still providing enough line length near the front to read a symbol positioned in the near region close to the front of the housing. Since the scan angle is narrower than heretofore, the virtual scan line length does not grow as fast as with conventional wide angle systems; hence, the pixels are not spread across a uselessly long virtual scan line at the far region of the working distance range. By way of numerical example, the virtual scan line of a known prior art reader is about 22.2 inches wide at about 24 inches in front of the housing. This is not only needlessly wide (most symbols are not more than a few inches long), but also can actually cause accidental reading of neighboring symbols that may be inadvertently covered by the virtual scan line where it extends well beyond the symbol that is intentionally being imaged.

In our preferred embodiment, the imaging lens is positioned around 1.7 inches back from the front of the housing, which is around twice as far, e.g., 0.7 to 0.9 inches, as in conventional readers. The focal length of the imaging lens is chosen such that the scan angle is around 36 degrees, which is 25% less than the conventional scan angle, e.g., 48 degrees, of prior art readers.

These changes have a dramatic impact on the performance of the reader. Specifically, with this arrangement, the virtual scan line is long enough to cover a 100% UPC symbol, which is positioned as close as a half inch from the front of the housing in the near region, but at 24 inches away in the far region, the virtual scan line is only about 16.7 inches long, as opposed to being about 22.2 inches long in the known prior art reader. The reduction in the virtual scan line length makes it possible to provide adequate resolution to read 100% UPC symbols at that far region, even when using a low resolution sensor with only 1500 pixels, for example, as opposed to 2500 or 3600 pixels according to the prior art reader. With a 1500 pixel sensor covering a virtual scan line that is about 16.7 inches long, each pixel covers only about 0.011 inches, which is still good enough to resolve the 0.013 inch widths of the bars and spaces in a 100% UPC symbol at 24 inches. In addition, the shortened virtual scan line length reduces the possibility of accidentally imaging and reading the wrong symbol.

Other aspects of the present invention reside in providing an illuminating light assembly for illuminating the symbol in said far region with intense illumination light over the shortened virtual scan line. The illuminating light assembly includes a pair of illuminating light sources, typically light emitting diodes, positioned deep in the housing at an increased spacing of at least two inches as measured along the optical path away from the front of the housing, for uniformly illuminating the symbol with illumination light. The illuminating light assembly also includes a pair of illuminating lenses positioned in the housing forwardly of the imaging lens. Advantageously, a light-transmissive recessed window is positioned in the housing along the optical path away from the front of the housing. The recessed window is better able to resist scratches, finger smudges, dirt and other contaminants from interfering with the reading.

Another feature of the present invention resides in a method of electro-optically reading symbols, which is performed by aiming a front of a handheld housing at a symbol during reading, sensing return light returning along an optical path away from the symbol that is located in a range of working distances relative to the front of the housing with a solid-state, low resolution image sensor having a linear array of pixels arranged in the housing along a scan direction and being less than 2000 in number, positioning an imaging lens deep in the housing at an increased spacing of at least one inch as measured along the optical path away from the front of the housing, configuring the imaging lens to capture the return light over a reduced scan angle that is less than 40 degrees and to project the captured light onto the sensor, and processing the return light sensed by the sensor into data relating to the symbol.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
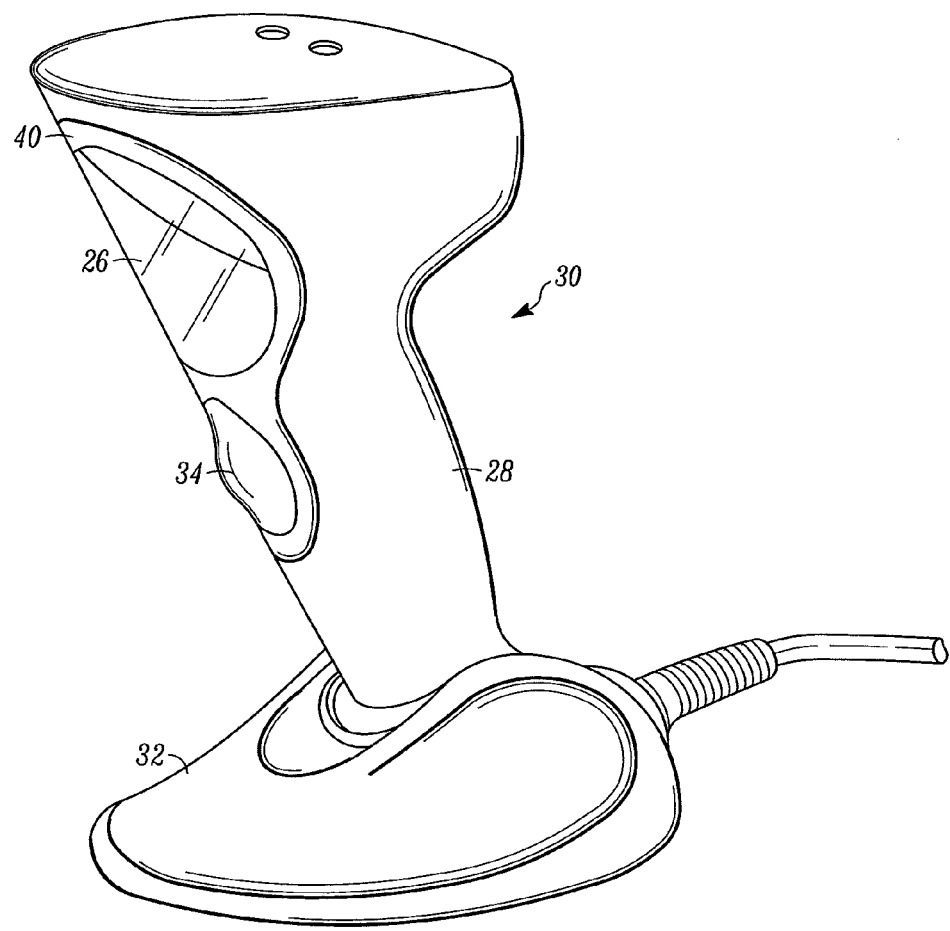
FIG. 1 is a perspective view of a reader operative in either a handheld mode, or a hands-free mode, for reading targets by image capture.

Reference numeral 30 in FIG. 1 generally identifies one embodiment of a data capture terminal or imaging reader having a generally gun-shaped housing 28 supported by a base 32 for supporting the housing on a counter top or analogous support surface. The housing 28 has a nose or front wall 40 that is aimed at a target bearing a symbol to be imaged and read. A light-transmissive window 26 is located at the front wall 40 and, as explained below, is preferably recessed in the housing and positioned away from the front wall 40. The reader 30 can thus be used in a hands-free mode as a stationary workstation in which the target bearing the symbol is slid, swiped past, or presented to, the window 26, or can be picked up off the countertop and held in an operator's hand and used in a handheld mode in which the reader is moved.

A trigger 34 on the housing is manually depressed to initiate imaging of the symbol to be read anywhere in a range of working distances away from the front wall 40. In another variation, the base 32 can be omitted, and housings of myriad other configurations can be employed. A cable, as illustrated in FIG. 1, connected to the base 32 can also be omitted, in which case, the reader 30 communicates with a base station or a remote host by a wireless transceiver, and the reader is electrically powered by an on-board rechargeable battery.

Figure 2:
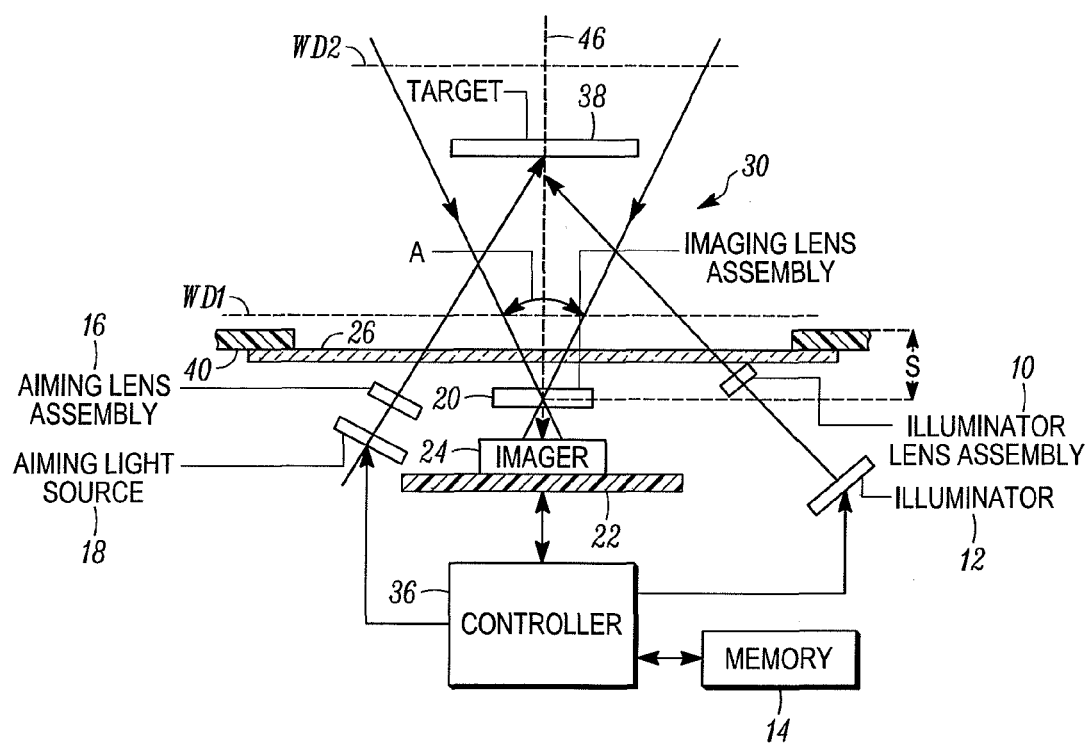
FIG. 2 is a schematic diagram of various components arranged within the reader of FIG. 1 in accordance with this invention.

As schematically shown in FIG. 2, an image sensor 24 is mounted on a printed circuit board 22 in the reader. The sensor 24 is a solid-state device, for example, a CCD, having a one-dimensional array of addressable image sensors or pixels arranged in a single, linear row, and operative for sensing return light captured by an imaging lens assembly 20 over a scan angle along an optical path or axis 46 through the window 26. The return light is scattered and/or reflected from a target or symbol 38. The imaging lens assembly 20 is operative for focusing the return light onto the array of pixels to enable the symbol 38 to be imaged. The symbol 38 is located anywhere in a range of working of distances between a close-in or near working distance (WD1) and a far-out or far working distance (WD2). In a preferred embodiment, WD1 is about a half inch from the front wall 40, and WD2 is about 24 inches away from the front wall 40.

An illuminating assembly is also preferably mounted in the housing and preferably includes an illuminator or illuminating light source 12, e.g., a pair of light emitting diodes (LEDs), and an illuminating lens assembly 10, e.g., a pair of illuminating lenses, to uniformly illuminate the symbol 38 with an illuminating light. An aiming assembly is also preferably mounted in the housing and preferably includes an aiming light source 18, e.g., an LED or a laser, and an aiming lens assembly 16 for generating a visible aiming light pattern on the symbol 38. The aiming pattern is useful to help the operator accurately aim the housing at the symbol 38.

As shown in FIG. 2, the sensor 24, the illuminating light source 12 and the aiming light source 18 are operatively connected to a controller or programmed microprocessor 36 operative for controlling the operation of these components. Preferably, the controller 36 is operative for processing the return light from the symbol 38, and for decoding the captured target image. A memory 14 is accessible by the controller 36 for storing and retrieving processed data corresponding to the symbol being imaged and read.

In operation, the controller 36 sends a command signal to energize the aiming light source 18 prior to reading, and also pulses the illuminating light source 12 for an illumination time period, e.g., 500 microseconds or less, and energizes and exposes the sensor 24 to sense the return light, e.g., illumination light and/or ambient light, from the symbol 38 during an exposure time period. A typical array needs about 16-33 milliseconds to acquire the entire target image and operates at a frame rate of about 30-60 frames per second.

In accordance with this invention, the sensor 24 is a low resolution image sensor having less than 2000 pixels in number, and preferably, 1500 pixels in number. Also, the imaging lens 20 is positioned deep in the housing 28 at an increased spacing (S) of at least one inch, and preferably greater than 1.5 inches, as measured along the optical path 46 away from the front wall of the housing. The imaging lens 20 is configured to capture the return light over a reduced scan angle (A) that is less than 40 degrees. In our preferred embodiment, the imaging lens 20 is positioned around 1.7 inches back from the front wall 40 of the housing, which is around twice as far, e.g., 0.7 to 0.9 inches, as in conventional readers. The focal length of the imaging lens 20 is chosen such that the scan angle (A) is around 36 degrees, which is 25% less than the conventional scan angle, e.g., 48 degrees, of prior art readers. The imaging lens 20 projects the pixels over a virtual scan line that extends over the scan direction entirely across the symbol 38 located in the near region WD1, and projects the pixels over a shortened virtual scan line that extends over the scan direction across the symbol 38 located in the far region WD2.

In further accordance with this invention, for the reader 30 to read symbols at the far region WD2, the illuminating light assembly 10, 12 must project illumination light that is intense enough to provide good image quality at that far region. In a wide angle reader of the prior art, the illuminating light assembly must project a wide fan of light to illuminate the virtual scan line from one end to the other. As the symbol 38 is positioned farther away from the front wall 40, the illumination becomes less intense, since it becomes spread out over a longer scan line. In accordance with this invention, since the virtual scan line is 25% shorter at the far region, the illumination light is 25% more intense, assuming that the total light energy output is equal. This increased efficiency can be used either to extend the range of working distances even further, or to enable a reduction in power consumption of the LEDs 12 used for illumination. This is particularly useful for battery-powered, cordless readers. A further advantage of the increased illumination intensity is that the illumination line, which some users may utilize to aim the reader at a symbol, is more visible when scanning at far distances, making the reader easier to use. In our preferred embodiment, the entire 1500 pixel array is used, simultaneously maximizing light intensity and making maximum use of the full resolution available from the sensor 24. In addition, the increased illumination efficiency compensates for the reduced light sensitivity of the less expensive 1500 pixel low resolution sensor 24.

In addition, unlike other known imaging readers, the illuminating light assembly 10, 12 is positioned further back from the front wall 40. This allows for more even illumination of the symbol 38 in the near region. When the illumination lenses 10 are close to the front wall 40, as in prior art readers, it is not possible to evenly illuminate the symbol since the end regions of the symbol will be illuminated only by one of the LEDs 12, and a center region of the symbol will be illuminated by both LEDs 12, and so will be much brighter. At a greater working distance, the two LEDs 12 overlap, and the illumination is much more even across the entire virtual scan line. When the illumination LEDs 12 are recessed deep into the housing away from the front wall, e.g., over two inches away, they can provide nearly complete overlap much closer to the front wall 40, thereby improving the reading performance.

A further advantage of recessing the illuminating light assembly is that it allows the window 26 to be recessed, thereby enabling the window to stay clean and scratch-free. Prior art readers have the window 26 very close to the front of the housing where the window is vulnerable to damage. It is also worth noting that recessing the illuminating light assembly would not be practical with prior art wide angle readers, since the wide illumination light paths would not have been able to project out of the housing without making the housing unacceptably wide.

As mentioned above, in the far region at 24 inches (as an example), each of the pixels of the low resolution sensor 24 has a field of view that is about 0.011 inches wide, whereas, in the prior art reader having a high resolution sensor of 2500 pixels and a 48 degree scan angle, each pixel has a field of view of about 0.0089 inches. In other words, each of the pixels in the instant invention has a field of view that is 23% larger than in the prior art. It might appear that the higher resolution of the prior art sensor would be advantageous, but in fact it is not, since a smaller pixel field of view reduces the strength of the electrical signal generated by the sensor.

When reading in the far region, it is challenging to provide enough signal for aggressive decoding. The signal can be increased, as described above, by increasing the illumination light intensity, but it can also be increased by increasing the size of the field of view of each individual pixel. The amount of light collected by each pixel is proportional to the area it sees. Hence, since each pixel of the instant invention collects 23% more signal than in the prior art, and since the illuminating light assembly of the instant invention provides 25% higher intensity due to the narrower scan angle that is illuminated, it can be seen that the instant invention provides 48% more signal than in prior art readers. This enhanced capability for reading at an extended working range provides yet another advantage.

Yet another advantage can be realized in the positioning of the illumination lenses 10 with respect to the imaging lens 20 by increasing the distance between the illumination LEDs 12 and the lenses 10 which concentrate the illumination light onto the symbol. The illuminating light assembly may include a slit aperture placed in front of each LED 12. The slit, which is illuminated from behind by the LED 12, is imaged onto the symbol, thereby forming a narrow line of illumination. By spacing the lens 10 farther from the aperture, the magnification of the illuminating light assembly is reduced, thereby enabling the use of larger apertures, which pass more of the LED light, and thereby increasing the optical efficiency of the illuminating light assembly. Decreasing the magnification also enables the use of an aperture that is large enough to be easily molded in a plastic chassis, and decreases aiming errors such that the illuminating light assembly is more likely to project light centered on the field of view without an adjustment.

In the preferred embodiment, the LED lens 10 is placed far in front of the imaging lens 20, thereby maximizing the distance between the LEDs 12 and the illuminating lenses 10, thereby minimizing magnification. If the imaging field of view had been wide, as in prior art readers, the LED lenses 10 would have needed to be spaced wide apart to prevent obscuring the wide field of view. This, in turn, would have made it impossible to fit the entire illuminating light assembly within the housing of a small handheld scanner. The reduced scan angle therefore allows the overall reader to be more compact than in prior art readers, while simultaneously allowing a low magnification illuminating light assembly.

As can be plainly understood from the description above, our preferred embodiment is a much more highly optimized system than has previously been developed. Conventional wisdom would be that a higher resolution sensor is better, but by reducing the resolution to the point where it is adequate, but not better than is needed, signal quality is significantly improved, thereby providing superior reading performance over an extended range of working distances. The optimized system described herein is therefore smaller, less expensive and performs better than prior art systems.

It will be understood that each of the elements described above, or two or more together, also may find a useful application in other types of constructions differing from the types described above.

While the invention has been illustrated and described as a reader for, and a method of, reading symbols by image capture employing a low resolution sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading symbols, comprising:
    a handheld housing having a front that faces a symbol during reading;
    a solid-state, low resolution image sensor having a linear array of pixels arranged in the housing along a scan direction and being less than 2000 in number, for sensing return light returning along an optical path away from the symbol that is located in a range of working distances relative to the front of the housing;
    an imaging lens positioned in the housing at a spacing of at least one inch as measured along the optical path away from the front of the housing, for capturing the return light over a reduced scan angle that is less than 40 degrees, and for projecting the captured light onto the sensor; and
    a controller for processing the return light sensed by the sensor into data relating to the symbol.

2. The reader of claim 1, and a light-transmissive recessed window on the housing and positioned in the housing along the optical path away from the front of the housing.

3. The reader of claim 1, wherein the image sensor is a one-dimensional charge coupled device (CCD) and has 1500 pixels in number.

4. The reader of claim 1, wherein the increased spacing of the imaging lens is greater than 1.5 inches away from the front of the housing.

5. The reader of claim 1, wherein the imaging lens projects the pixels over a virtual scan line that extends over the scan direction entirely across the symbol located at about one-half inch away from the front of the housing in a near region of the range of working distances.

6. The reader of claim 1, wherein the imaging lens projects the pixels over a shortened virtual scan line that extends over the scan direction across the symbol located at about twenty-four inches away from the front of the housing in a far region of the range of working distances, and wherein the projected pixels have a size adequate to resolve the symbol in said far region.

7. The reader of claim 6, and an illuminating light assembly for illuminating the symbol in said far region with intense illumination light over the shortened virtual scan line.

8. The reader of claim 1, and an illuminating light assembly including a pair of illuminating light sources positioned deep in the housing at an increased spacing of at least two inches as measured along the optical path away from the front of the housing, for uniformly illuminating the symbol with illumination light.

9. The reader of claim 8, wherein the illuminating light assembly including a pair of illuminating lenses positioned in the housing forwardly of the imaging lens.

10. A method of electro-optically reading symbols, comprising the steps of:
    aiming a front of a handheld housing at a symbol during reading;
    sensing return light returning along an optical path away from the symbol that is located in a range of working distances relative to the front of the housing with a solid-state, low resolution image sensor having a linear array of pixels arranged in the housing along a scan direction and being less than 2000 in number;
    positioning an imaging lens in the housing at a spacing of at least one inch as measured along the optical path away from the front of the housing, and configuring the imaging lens to capture the return light over a reduced scan angle that is less than 40 degrees, and to project the captured light onto the sensor; and
    processing the return light sensed by the sensor into data relating to the symbol.

11. The method of claim 10, and positioning a light-transmissive recessed window in the housing along the optical path away from the front of the housing.

12. The method of claim 10, and configuring the image sensor as a one-dimensional charge coupled device (CCD) with 1500 pixels in number.

13. The method of claim 10, wherein the step of positioning the imaging lens is performed by configuring the increased spacing of the imaging lens to be greater than 1.5 inches away from the front of the housing.

14. The method of claim 10, and configuring the imaging lens to project the pixels over a virtual scan line that extends over the scan direction entirely across the symbol located at about one-half inch away from the front of the housing in a near region of the range of working distances.

15. The method of claim 10, and configuring the imaging lens to project the pixels over a shortened virtual scan line that extends over the scan direction across the symbol located at about twenty-four inches away from the front of the housing in a far region of the range of working distances, and wherein the projected pixels have a size adequate to resolve the symbol in said far region.

16. The method of claim 15, and illuminating the symbol in said far region with intense illumination light over the shortened virtual scan line.

17. The method of claim 10, and uniformly illuminating the symbol with illumination light by positioning a pair of illuminating light sources deep in the housing at an increased spacing of at least two inches as measured along the optical path away from the front of the housing.

18. The method of claim 17, and positioning a pair of illuminating lenses in the housing forwardly of the imaging lens.

* * * * *

UNITED STATES PATENT AND TRADEMARK OFFICE
CERTIFICATE OF CORRECTION

| | | |
|---|---|---|
| PATENT NO. | : 8,261,991 B2 | Page 1 of 1 |
| APPLICATION NO. | : 12/834312 | |
| DATED | : September 11, 2012 | |
| INVENTOR(S) | : Barkan et al. | |

It is certified that error appears in the above-identified patent and that said Letters Patent is hereby corrected as shown below:

In Column 6, Line 64, delete "wall" and insert -- wall 40 --, therefor.

Signed and Sealed this
Twelfth Day of February, 2013

Teresa Stanek Rea
*Acting Director of the United States Patent and Trademark Office*